Dec. 27, 1960 C. GRÜNDLER 2,966,025
BRAKE MEANS FOR SPINNING AND TWISTING SPINDLES
Filed Oct. 21, 1957 2 Sheets-Sheet 1

INVENTOR.
CHRISTOF GRÜNDLER.
BY
K. H. Mayr
ATTORNEY.

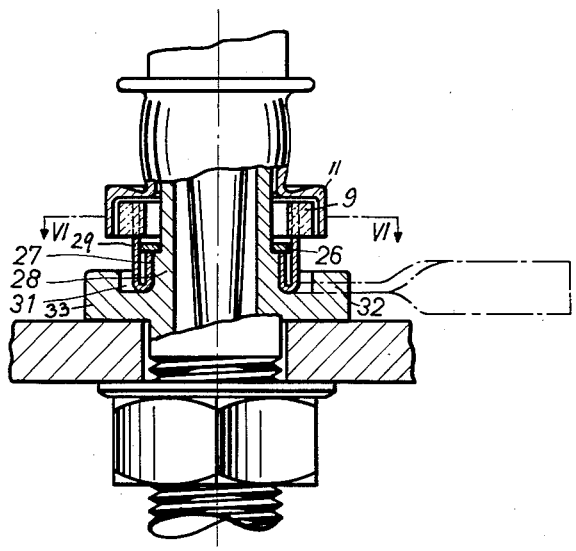
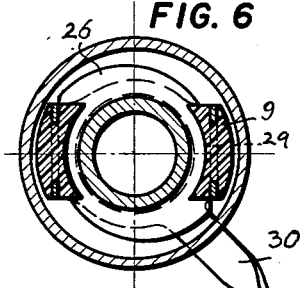
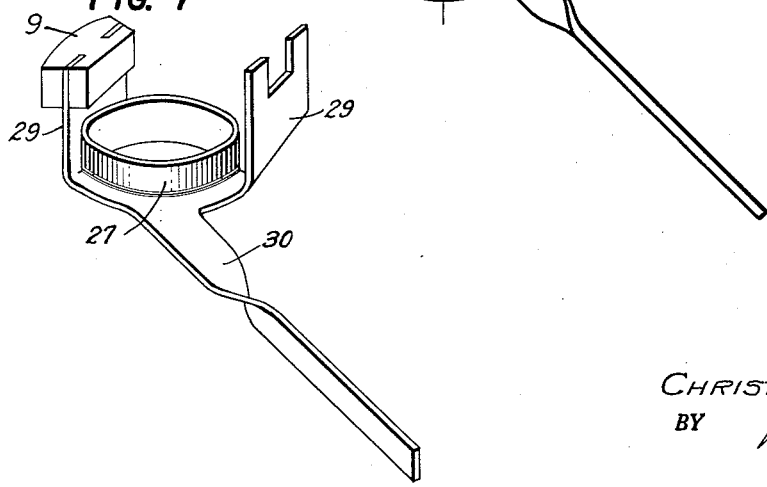

United States Patent Office 2,966,025
Patented Dec. 27, 1960

2,966,025

BRAKE MEANS FOR SPINNING AND TWISTING SPINDLES

Christof Gründler, Winterthur, Switzerland, assignor to Joh. Jacob Rieter & Co. Ltd., Winterthur, Switzerland, a corporation of Switzerland Filed Oct. 21, 1957, Ser. No. 691,188

Claims priority, application Switzerland Oct. 19, 1956

4 Claims. (Cl. 57—88)

The present invention relates to spinning and twisting spindles, more particularly to a brake for such spindles in which the brake shoes act on the inside of the rotating part of the spindle.

Brakes for spindles on textile machinery have been proposed which include an annular brake element which is arranged eccentrically of the rotation axis of the spindle whereby the brake element surrounds a portion of the spindle, preferably at the lower wharve flange. There is a clearance between the interior of this annular brake element and the rotating part of the spindle when the brake is disengaged and, due to the eccentric support of the brake element, the brake is engaged by rotating the brake element. This conventional brake has the disadvantage that fly enters the clearance between the wharve and the brake element whereby the operation of the spindle is adversely affected and that the spindle bearing is excessively loaded by quickly developing relatively great forces caused by the eccentric arrangement, although the brake may be actuated with little force, unless the device is operated with greatest care. Interiorly acting brakes have been proposed which include a separate guide ring for radially guiding the brake shoes and which include springs which return the brake shoes to inactive position and special arresting devices for the guide ring. It has been found that these devices can not be used in connection with small spindles because there is not sufficient room for accommodating sufficiently powerful springs which rest on the guides for the brake shoes.

A satisfactory spindle brake must comply with a great variety of requirements. The brake must be so small that it can be used in connection with the smallest spindles without substantially enlarging or elongating the spindle. The brake must be self-engaging so that it can be operated with little force and should, if possible, disengage itself without manipulation by the operator. A double acting brake is preferred because it preserves the spindle bearing since the radial forces acting on the bearing are compensated. It is desired that the brake be fully protected against fly and fouling without the provision of additional coverings.

It is an object of the present invention to provide a spindle brake which answers the requirements stated in the paragraph next above and which avoids the difficulties experienced with conventional brakes. The brake according to the invention is of the interior type and includes resilient elements on which the brake shoes are mounted and which can be radially displaced by movement of the resilient elements relatively to a cam member which engages the resilient elements.

The novel features which are considered characteristic of the invention are set forth with particularity in the appended claims. The invention itself, however, and additional objects and advantages thereof will best be understood from the following description of embodiments thereof when read in connection with the accompanying drawings in which:

Fig. 5 is a longitudinal part sectional view of a modified brake arrangement according to the invention.

Fig. 6 is a cross sectional plan view of the device shown in Fig. 5, the section being made along line VI—VI of Fig. 5.

Fig. 7 is a perspective view of a brake shoe carrier used in the device shown in Figs. 5 and 6.

Figure 1:
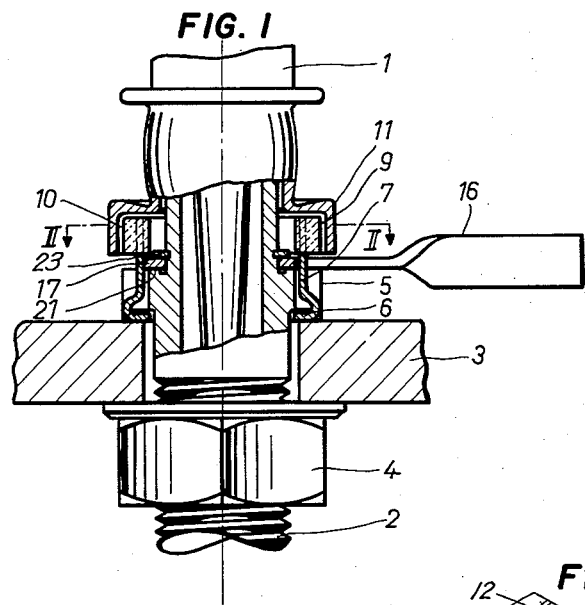
Fig. 1 is a part longitudinal sectional view of a spindle equipped with a brake according to the invention.
Figure 3:
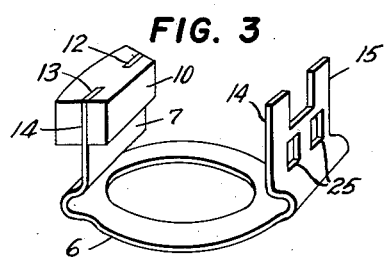
Fig. 3 is a perspective illustration of a carrier element used in the device shown in Figs. 1 and 2 and having resilient portions to which brake shoes are mounted.
Figure 2:
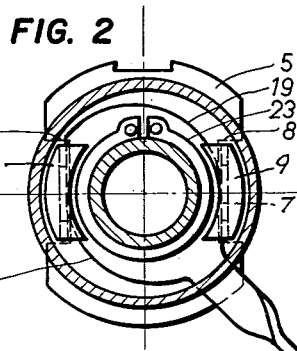
Fig. 2 is a cross sectional plan view of the spindle shown in Fig. 1, the section being made along line II—II of Fig. 1.

Referring more particularly to Figs. 1 to 4 of the drawings, numeral 1 designates a spindle whose lower end is received in a bearing 2 mounted on a spindle rail 3 by means of a nut 4 and a flange 5. An annular member 6 is interposed between the flange 5 and the rail 3, the member 6 being provided with diametrically opposed resilient flaps 7 which are upwardly bent. The flange 5 is provided with diametrically opposed recesses 8 for receiving the resilient flaps 7. Brake shoes 9 and 10 are individually mounted on the upper ends of the flaps 7 and are adapted to engage the inner surface of a cylindrical portion extending downwards from the lower wharve 11 of the spindle. Each brake shoe is provided with lateral slits 12, 13 for receiving tongues 14, 15, respectively, extending upwards from the flaps 7 (Fig. 3). The dimensions of the slits 12, 13 and of the tongues 14, 15 are such that the brake shoes can be easily mounted on and removed from the carriers formed by the flaps 7 and the tongues 14, 15. The brake shoes are made of a material having good friction qualities, preferably a thermosetting resin, for example, phenolformaldehyde. Downward movement of the brake shoes on the flaps 7 is limited by a horizontal edge of the flap extending between the tongues 14, 15. Upward movement of the brake shoes is prevented by the wharve 11. The flaps 7 are provided with apertures 25 controlling the resiliency of the flaps and assisting in cooling the brake. An annular portion 17 at the end of a lever 16 surrounds the spindle bearing 2 and rests on a shoulder 21 of the bearing adjacent to the lower ends of the brake shoes 9 and 10. Axial movement of the portion 17 on the bearing 2 is prevented by a split ring 23 received in part in an annular recess of the bearing 2.

Figure 4:
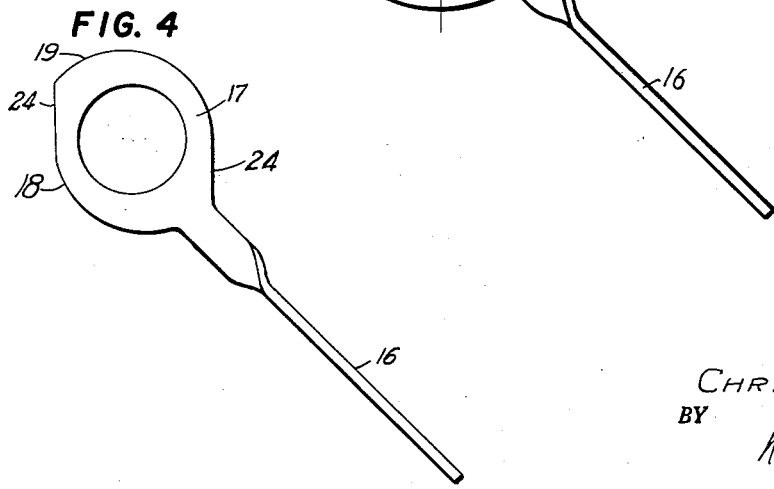
Fig. 4 is a plan view of a brake actuating member forming part of the device shown in Figs. 1 and 2.

As seen in Fig. 4 the annular portion 17 of the lever 16 is provided with diametrically opposed cam surfaces 18 and 19 consisting each of an eccentric part-circular portion extending from parallel straight portions 24. The latter are parallel to and do not engage the flaps 7 when the device is in the position shown in Fig. 2.

The brake operates as follows:

Upon swinging of the lever 16 in clockwise direction the active radius of the eccentric portions 18 and 19 increases gradually, forcing the flaps 7 outwards until the brake shoes 9 and 10 engage the inside surface of the cylindrical portion of the wharve or whirl 11, stopping rotation of the wharve. The brake is disengaged by moving the lever 16 in counterclockwise direction.

The modification of the brake shown in Figs. 5 to 7 is based on the same principles as the brake according to Figs. 1 to 4. The cam member 26, however, is stationary, sitting on a shoulder on the spindle bearing 28. Below this shoulder a cylindrical part 27 surrounds the bearing 28. The part 27 is at one end of a brake lever 30. Resilient diametrically opposed flaps 29 extend parallel to the rotation axis of the spindle and serve as carriers for brake shoes.

In order to provide the length of the carriers 27 needed to produce the desired resiliency without moving up the wharve, an annular recess 31 is provided in a flange 33 of the spindle bearing. A radial recess 32 is connected with the recess 31 to accommodate the lever 30.

I claim:

1. A brake for a spinning and twisting spindle provided with a whirl having an inner surface, said brake comprising a carrier element arranged coaxially of the whirl and having resilient carrier portions placed symmetrically around the rotation axis of the whirl, brake shoes individually supported by said resilient carrier portions and placed inside the whirl symmetrically with respect to the rotation axis of the whirl and adapted to engage the inner whirl surface, a cam element, one of said elements being oscillatory around the rotation axis of the whirl, the other element being stationary, said cam element having cam portions individually slidingly engaging and spreading said resilient carrier portions and brake shoes connected thereto in radial direction and symmetrically with respect to the rotation axis of the whirl upon relative oscillatory movement of said cam element and of said carrier element around the rotation axis of the whirl, and means connected to one of said elements for oscillating the respective element around the rotation axis of the whirl.

2. A brake as defined in claim 1 and wherein said cam portions are placed adjacent to said brake shoes.

3. A brake as defined in claim 1 including a bearing member for the spindle, said carrier element having a part rigidly connected to said bearing member, and said resilient carrier portions being in the form of flaps extending from said part into the whirl.

4. A spinning or twisting spindle comprising a whirl portion having an interior surface, a bearing for the spindle, a carrier element oscillatably mounted on said bearing for oscillatory movement around the rotation axis of the spindle, said carrier element having resilient carrier portions extending substantially parallel to the rotation axis of the spindle and into the interior of said whirl and being placed symmetrically of the spindle axis, a brake shoe mounted on each of said portions and adapted to engage the interior whirl surface, cam means radially extending from said bearing and engaging said carrier portions, and means connected to said carrier element for oscillating said carrier element relatively to said cam means for radially displacing said brake shoes towards and from said interior whirl surface at a right angle and symmetrically to the rotation axis of the whirl.

References Cited in the file of this patent

UNITED STATES PATENTS

| | | |
|---|---|---|
| 2,481,043 | Sacchini | Sept. 6, 1949 |
| 2,533,162 | Boyden | Dec. 5, 1950 |
| 2,566,258 | Sweet | Aug. 28, 1951 |
| 2,657,523 | Kooistra | Nov. 3, 1953 |
| 2,800,762 | Würmli | July 30, 1957 |

FOREIGN PATENTS

| | | |
|---|---|---|
| 458,136 | Italy | July 1, 1950 |
| 517,696 | Germany | Feb. 9, 1931 |